(12) United States Patent
Powell et al.

(10) Patent No.: US 8,749,529 B2
(45) Date of Patent: Jun. 10, 2014

(54) SENSOR-IN-PIXEL DISPLAY SYSTEM WITH NEAR INFRARED FILTER

(75) Inventors: Karlton D. Powell, Lake Stevens, WA (US); Rajesh Manohar Dighde, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 206 days.

(21) Appl. No.: 13/409,967

(22) Filed: Mar. 1, 2012

(65) Prior Publication Data

US 2013/0229357 A1 Sep. 5, 2013

(51) Int. Cl.
*G06F 3/042* (2006.01)

(52) U.S. Cl.
USPC .......................................... 345/175; 345/173

(58) Field of Classification Search
USPC ............. 345/173, 175, 104; 178/18.01, 18, 9, 178/18.11
See application file for complete search history.

(56) References Cited

U.S. PATENT DOCUMENTS

| | | | |
|---|---|---|---|
| 4,046,975 A | 9/1977 | Seeger, Jr. | |
| 4,065,649 A | 12/1977 | Carter et al. | |
| 4,243,861 A | 1/1981 | Strandwitz | |
| 4,302,648 A | 11/1981 | Sado et al. | |
| 4,317,013 A | 2/1982 | Larson | |
| 4,365,130 A | 12/1982 | Christensen | |
| 4,492,829 A | 1/1985 | Rodrique | |
| 4,527,021 A | 7/1985 | Morikawa et al. | |
| 4,559,426 A | 12/1985 | Van Zeeland et al. | |
| 4,576,436 A | 3/1986 | Daniel | |
| 4,588,187 A | 5/1986 | Dell | |
| 4,607,147 A | 8/1986 | Ono et al. | |
| 4,615,579 A | 10/1986 | Whitehead | |
| 4,651,133 A | 3/1987 | Ganesan et al. | |
| 5,220,521 A | 6/1993 | Kikinis | |
| 5,283,559 A | 2/1994 | Kalendra et al. | |
| 5,331,443 A | 7/1994 | Stanisci | |

(Continued)

FOREIGN PATENT DOCUMENTS

| | | |
|---|---|---|
| CN | 1440513 | 9/2003 |
| EP | 2353978 | 8/2011 |

(Continued)

OTHER PUBLICATIONS

Schoning, et al., "Building Interactive Multi-Touch Surfaces", Retrieved at <<http://www.libavg.com/raw-attachment/wiki/Multitouch/Multitouchguide_draft.pdf >>,Proceedings of Journal of Graphics, GPU, and Game Tools, Springer Verlag, 2010, vol. 14, Issue 3, Nov. 2009, pp. 27-49.

(Continued)

*Primary Examiner* — Ricardo L Osorio
(74) *Attorney, Agent, or Firm* — Jeremy Snodgrass; Glen Johnson; Micky Minhas (57) ABSTRACT

A display system includes both a cover panel and a display panel. The display panel includes multiple display pixels and multiple sensor elements configured to detect infrared light reflected from an object touching or close to the cover panel. The filter layer is configured to increase rejection of near infrared light reflected from the object prior to detection of the infrared light by the multiple sensor elements. The filter layer can be positioned in different locations, such as between the display panel and the cover panel, within the display panel, or within or on top of the cover panel.

20 Claims, 8 Drawing Sheets

(56) References Cited

U.S. PATENT DOCUMENTS

| | | |
|---|---|---|
| 5,339,382 A | 8/1994 | Whitehead |
| 5,406,415 A | 4/1995 | Kelly |
| 5,548,477 A | 8/1996 | Kumar et al. |
| 5,558,577 A | 9/1996 | Kato |
| 5,681,220 A | 10/1997 | Bertram et al. |
| 5,745,376 A | 4/1998 | Barker et al. |
| 5,748,114 A | 5/1998 | Koehn |
| 5,781,406 A | 7/1998 | Hunte |
| 5,807,175 A | 9/1998 | Davis et al. |
| 5,818,361 A | 10/1998 | Acevedo |
| 5,828,770 A | 10/1998 | Leis et al. |
| 5,861,990 A | 1/1999 | Tedesco |
| 5,874,697 A | 2/1999 | Selker et al. |
| 5,926,170 A | 7/1999 | Oba |
| 5,971,635 A | 10/1999 | Wise |
| 5,999,147 A | 12/1999 | Teitel |
| 6,002,389 A | 12/1999 | Kasser |
| 6,005,209 A | 12/1999 | Burleson et al. |
| 6,012,714 A | 1/2000 | Worley et al. |
| 6,040,823 A | 3/2000 | Seffernick et al. |
| 6,044,717 A | 4/2000 | Biegelsen et al. |
| 6,046,857 A | 4/2000 | Morishima et al. |
| 6,061,644 A | 5/2000 | Leis |
| 6,178,443 B1 | 1/2001 | Lin |
| 6,232,934 B1 | 5/2001 | Heacock et al. |
| 6,254,105 B1 | 7/2001 | Rinde et al. |
| 6,279,060 B1 | 8/2001 | Luke et al. |
| 6,300,986 B1 | 10/2001 | Travis |
| 6,329,617 B1 | 12/2001 | Burgess |
| 6,344,791 B1 | 2/2002 | Armstrong |
| 6,353,503 B1 | 3/2002 | Spitzer et al. |
| 6,380,497 B1 | 4/2002 | Hashimoto et al. |
| 6,437,682 B1 | 8/2002 | Vance |
| 6,511,378 B1 | 1/2003 | Bhatt et al. |
| 6,532,147 B1 | 3/2003 | Christ, Jr. |
| 6,543,949 B1 | 4/2003 | Ritchey et al. |
| 6,565,439 B2 | 5/2003 | Shinohara et al. |
| 6,600,121 B1 | 7/2003 | Olodort et al. |
| 6,603,408 B1 | 8/2003 | Gaba |
| 6,617,536 B2 | 9/2003 | Kawaguchi |
| 6,685,369 B2 | 2/2004 | Lien |
| 6,704,864 B1 | 3/2004 | Philyaw |
| 6,721,019 B2 | 4/2004 | Kono et al. |
| 6,725,318 B1 | 4/2004 | Sherman et al. |
| 6,774,888 B1 | 8/2004 | Genduso |
| 6,776,546 B2 | 8/2004 | Kraus et al. |
| 6,784,869 B1 | 8/2004 | Clark et al. |
| 6,795,146 B2 | 9/2004 | Dozov et al. |
| 6,813,143 B2 | 11/2004 | Makela |
| 6,819,316 B2 | 11/2004 | Schulz et al. |
| 6,847,488 B2 | 1/2005 | Travis |
| 6,856,506 B2 | 2/2005 | Doherty et al. |
| 6,861,961 B2 | 3/2005 | Sandbach et al. |
| 6,914,197 B2 | 7/2005 | Doherty et al. |
| 6,950,950 B2 | 9/2005 | Sawyers et al. |
| 6,970,957 B1 | 11/2005 | Oshins et al. |
| 6,976,799 B2 | 12/2005 | Kim et al. |
| 7,025,908 B1 | 4/2006 | Hayashi et al. |
| 7,051,149 B2 | 5/2006 | Wang et al. |
| 7,091,436 B2 | 8/2006 | Serban |
| 7,101,048 B2 | 9/2006 | Travis |
| 7,106,222 B2 | 9/2006 | Ward et al. |
| 7,123,292 B1 | 10/2006 | Seeger et al. |
| 7,152,985 B2 | 12/2006 | Benitez et al. |
| 7,194,662 B2 | 3/2007 | Do et al. |
| 7,199,931 B2 | 4/2007 | Boettiger et al. |
| 7,213,991 B2 | 5/2007 | Chapman et al. |
| 7,277,087 B2 | 10/2007 | Hill et al. |
| 7,447,934 B2 | 11/2008 | Dasari et al. |
| 7,469,386 B2 | 12/2008 | Bear et al. |
| 7,499,037 B2 | 3/2009 | Lube |
| 7,499,216 B2 | 3/2009 | Niv et al. |
| 7,502,803 B2 | 3/2009 | Culter et al. |
| 7,515,143 B2 | 4/2009 | Keam et al. |
| 7,542,052 B2 | 6/2009 | Solomon et al. |
| 7,558,594 B2 | 7/2009 | Wilson |
| 7,559,834 B1 | 7/2009 | York |
| 7,561,131 B2 | 7/2009 | Ijzerman et al. |
| 7,636,921 B2 | 12/2009 | Louie |
| 7,643,213 B2 | 1/2010 | Boettiger et al. |
| 7,656,392 B2 | 2/2010 | Bolender |
| 7,733,326 B1 | 6/2010 | Adiseshan |
| 7,777,972 B1 | 8/2010 | Chen et al. |
| 7,782,342 B2 | 8/2010 | Koh |
| 7,813,715 B2 | 10/2010 | McKillop et al. |
| 7,855,716 B2 | 12/2010 | McCreary et al. |
| 7,884,807 B2 | 2/2011 | Hovden et al. |
| D636,397 S | 4/2011 | Green |
| 7,918,559 B2 | 4/2011 | Tesar |
| 7,928,964 B2 | 4/2011 | Kolmykov-Zotov et al. |
| 7,945,717 B2 | 5/2011 | Rivalsi |
| 7,967,462 B2 | 6/2011 | Ogiro et al. |
| 7,973,771 B2 | 7/2011 | Geaghan |
| 7,978,281 B2 | 7/2011 | Vergith et al. |
| 8,035,614 B2 | 10/2011 | Bell et al. |
| 8,035,624 B2 | 10/2011 | Bell et al. |
| 8,053,688 B2 | 11/2011 | Conzola et al. |
| 8,065,624 B2 | 11/2011 | Morin et al. |
| 8,069,356 B2 | 11/2011 | Rathi et al. |
| RE42,992 E | 12/2011 | David |
| 8,102,362 B2 | 1/2012 | Ricks et al. |
| 8,115,718 B2 | 2/2012 | Chen et al. |
| 8,130,203 B2 | 3/2012 | Westerman |
| 8,154,524 B2 | 4/2012 | Wilson et al. |
| D659,139 S | 5/2012 | Gengler |
| 8,169,421 B2 | 5/2012 | Wright et al. |
| 8,229,509 B2 | 7/2012 | Paek et al. |
| 8,229,522 B2 | 7/2012 | Kim et al. |
| 8,310,768 B2 | 11/2012 | Lin et al. |
| 8,345,920 B2 | 1/2013 | Ferren et al. |
| 8,416,206 B2 | 4/2013 | Carpendale et al. |
| 8,466,902 B2 | 6/2013 | Boer et al. |
| 2002/0134828 A1 | 9/2002 | Sandbach et al. |
| 2003/0165017 A1 | 9/2003 | Amitai |
| 2003/0197687 A1 | 10/2003 | Shetter |
| 2004/0258924 A1 | 12/2004 | Berger et al. |
| 2004/0268000 A1 | 12/2004 | Barker et al. |
| 2005/0057515 A1 | 3/2005 | Bathiche |
| 2005/0059489 A1 | 3/2005 | Kim |
| 2005/0100690 A1 | 5/2005 | Mayer et al. |
| 2005/0146512 A1 | 7/2005 | Hill et al. |
| 2005/0264653 A1 | 12/2005 | Starkweather et al. |
| 2005/0264988 A1 | 12/2005 | Nicolosi |
| 2006/0028400 A1 | 2/2006 | Lapstun et al. |
| 2006/0085658 A1 | 4/2006 | Allen et al. |
| 2006/0125799 A1 | 6/2006 | Hillis et al. |
| 2006/0154725 A1 | 7/2006 | Glaser et al. |
| 2006/0156415 A1 | 7/2006 | Rubinstein et al. |
| 2006/0181514 A1 | 8/2006 | Newman |
| 2006/0195522 A1 | 8/2006 | Miyazaki |
| 2006/0227393 A1 | 10/2006 | Herloski |
| 2006/0238550 A1 | 10/2006 | Page |
| 2006/0279501 A1 | 12/2006 | Lu et al. |
| 2007/0002587 A1 | 1/2007 | Miyashita |
| 2007/0062089 A1 | 3/2007 | Homer et al. |
| 2007/0072474 A1 | 3/2007 | Beasley et al. |
| 2007/0182663 A1 | 8/2007 | Biech |
| 2007/0189667 A1 | 8/2007 | Wakita et al. |
| 2007/0234420 A1 | 10/2007 | Novotney et al. |
| 2007/0236408 A1 | 10/2007 | Yamaguchi et al. |
| 2007/0247432 A1 | 10/2007 | Oakley |
| 2007/0260892 A1 | 11/2007 | Paul et al. |
| 2007/0283179 A1 | 12/2007 | Burnett et al. |
| 2008/0005423 A1 | 1/2008 | Jacobs et al. |
| 2008/0088593 A1* | 4/2008 | Smoot ............ 345/173 |
| 2008/0104437 A1 | 5/2008 | Lee |
| 2008/0122803 A1 | 5/2008 | Izadi et al. |
| 2008/0150913 A1 | 6/2008 | Bell et al. |
| 2008/0151478 A1 | 6/2008 | Chern |
| 2008/0158185 A1 | 7/2008 | Westerman |
| 2008/0179507 A2* | 7/2008 | Han ............ 250/224 |
| 2008/0225205 A1 | 9/2008 | Travis |
| 2008/0238884 A1 | 10/2008 | Harish |
| 2008/0253822 A1 | 10/2008 | Matias |

(56) References Cited

U.S. PATENT DOCUMENTS

| | | |
|---|---|---|
| 2008/0316002 A1 | 12/2008 | Brunet et al. |
| 2008/0320190 A1 | 12/2008 | Lydon et al. |
| 2009/0009476 A1 | 1/2009 | Daley, III |
| 2009/0033623 A1 | 2/2009 | Lin |
| 2009/0073957 A1 | 3/2009 | Newland et al. |
| 2009/0096738 A1 | 4/2009 | Chen et al. |
| 2009/0140985 A1 | 6/2009 | Liu |
| 2009/0142020 A1 | 6/2009 | Van Ostrand et al. |
| 2009/0189974 A1 | 7/2009 | Deering |
| 2009/0251008 A1 | 10/2009 | Sugaya |
| 2009/0262492 A1 | 10/2009 | Whitchurch et al. |
| 2009/0303204 A1 | 12/2009 | Nasiri et al. |
| 2009/0320244 A1 | 12/2009 | Lin |
| 2009/0321490 A1 | 12/2009 | Groene et al. |
| 2010/0001963 A1 | 1/2010 | Doray et al. |
| 2010/0026656 A1 | 2/2010 | Hotelling et al. |
| 2010/0038821 A1 | 2/2010 | Jenkins et al. |
| 2010/0045633 A1 | 2/2010 | Gettemy |
| 2010/0051432 A1 | 3/2010 | Lin et al. |
| 2010/0053534 A1 | 3/2010 | Hsieh et al. |
| 2010/0053771 A1 | 3/2010 | Travis et al. |
| 2010/0072351 A1 | 3/2010 | Mahowald |
| 2010/0077237 A1 | 3/2010 | Sawyers |
| 2010/0085321 A1 | 4/2010 | Pundsack |
| 2010/0102206 A1 | 4/2010 | Cazaux et al. |
| 2010/0103112 A1 | 4/2010 | Yoo et al. |
| 2010/0149073 A1 | 6/2010 | Chaum et al. |
| 2010/0149111 A1 | 6/2010 | Olien |
| 2010/0149117 A1 | 6/2010 | Chien et al. |
| 2010/0161522 A1 | 6/2010 | Tirpak et al. |
| 2010/0164857 A1 | 7/2010 | Liu et al. |
| 2010/0171891 A1 | 7/2010 | Kaji et al. |
| 2010/0174421 A1 | 7/2010 | Tsai et al. |
| 2010/0177388 A1 | 7/2010 | Cohen et al. |
| 2010/0180063 A1 | 7/2010 | Ananny et al. |
| 2010/0188299 A1 | 7/2010 | Rinehart et al. |
| 2010/0206614 A1 | 8/2010 | Park et al. |
| 2010/0222110 A1 | 9/2010 | Kim et al. |
| 2010/0250988 A1 | 9/2010 | Okuda et al. |
| 2010/0274932 A1 | 10/2010 | Kose |
| 2010/0279768 A1 | 11/2010 | Huang et al. |
| 2010/0282953 A1 | 11/2010 | Tam |
| 2010/0289457 A1 | 11/2010 | Onnerud et al. |
| 2010/0295812 A1 | 11/2010 | Burns et al. |
| 2010/0296163 A1 | 11/2010 | Saarikko |
| 2010/0302378 A1 | 12/2010 | Marks et al. |
| 2010/0306538 A1 | 12/2010 | Thomas et al. |
| 2010/0308778 A1 | 12/2010 | Yamazaki et al. |
| 2010/0308844 A1 | 12/2010 | Day et al. |
| 2010/0315348 A1 | 12/2010 | Jellicoe et al. |
| 2010/0325155 A1 | 12/2010 | Skinner et al. |
| 2011/0002577 A1 | 1/2011 | Van Ostrand |
| 2011/0007047 A1 | 1/2011 | Fujioka et al. |
| 2011/0012873 A1 | 1/2011 | Prest et al. |
| 2011/0019123 A1 | 1/2011 | Prest et al. |
| 2011/0031287 A1 | 2/2011 | Le Gette et al. |
| 2011/0032215 A1 | 2/2011 | Sirotich et al. |
| 2011/0037721 A1 | 2/2011 | Cranfill et al. |
| 2011/0043990 A1 | 2/2011 | Mickey et al. |
| 2011/0060926 A1 | 3/2011 | Brooks et al. |
| 2011/0069148 A1 | 3/2011 | Jones et al. |
| 2011/0072391 A1 | 3/2011 | Hanggie et al. |
| 2011/0074688 A1 | 3/2011 | Hull et al. |
| 2011/0096035 A1 | 4/2011 | Shen |
| 2011/0102326 A1 | 5/2011 | Casparian et al. |
| 2011/0122071 A1* | 5/2011 | Powell .......................... 345/173 |
| 2011/0134032 A1 | 6/2011 | Chiu et al. |
| 2011/0163955 A1 | 7/2011 | Nasiri et al. |
| 2011/0164370 A1 | 7/2011 | McClure et al. |
| 2011/0167181 A1 | 7/2011 | Minoo et al. |
| 2011/0167287 A1 | 7/2011 | Walsh et al. |
| 2011/0167391 A1 | 7/2011 | Momeyer et al. |
| 2011/0169778 A1 | 7/2011 | Nungester et al. |
| 2011/0170289 A1 | 7/2011 | Allen et al. |
| 2011/0179864 A1 | 7/2011 | Raasch et al. |
| 2011/0184646 A1 | 7/2011 | Wong et al. |
| 2011/0193787 A1 | 8/2011 | Morishige et al. |
| 2011/0205372 A1 | 8/2011 | Miramontes |
| 2011/0227913 A1 | 9/2011 | Hyndman |
| 2011/0234535 A1* | 9/2011 | Hung et al. .................. 345/175 |
| 2011/0235179 A1 | 9/2011 | Simmonds |
| 2011/0242440 A1 | 10/2011 | Noma et al. |
| 2011/0242670 A1 | 10/2011 | Simmonds |
| 2011/0248920 A1 | 10/2011 | Larsen |
| 2011/0290686 A1 | 12/2011 | Huang |
| 2011/0291993 A1* | 12/2011 | Miyazaki et al. .............. 345/175 |
| 2011/0297566 A1 | 12/2011 | Gallagher et al. |
| 2011/0304577 A1 | 12/2011 | Brown |
| 2011/0304815 A1 | 12/2011 | Newell |
| 2011/0316807 A1 | 12/2011 | Corrion |
| 2012/0007821 A1 | 1/2012 | Zaliva |
| 2012/0023459 A1 | 1/2012 | Westerman |
| 2012/0024682 A1 | 2/2012 | Huang et al. |
| 2012/0044179 A1 | 2/2012 | Hudson |
| 2012/0047368 A1 | 2/2012 | Chinn et al. |
| 2012/0050975 A1 | 3/2012 | Garelli et al. |
| 2012/0062850 A1 | 3/2012 | Travis |
| 2012/0068919 A1 | 3/2012 | Lauder et al. |
| 2012/0075249 A1 | 3/2012 | Hoch |
| 2012/0092279 A1 | 4/2012 | Martin |
| 2012/0094257 A1 | 4/2012 | Pillischer et al. |
| 2012/0099749 A1 | 4/2012 | Rubin et al. |
| 2012/0117409 A1 | 5/2012 | Lee et al. |
| 2012/0127118 A1 | 5/2012 | Nolting et al. |
| 2012/0140396 A1 | 6/2012 | Zeliff et al. |
| 2012/0145525 A1 | 6/2012 | Ishikawa |
| 2012/0162126 A1* | 6/2012 | Yuan et al. .................. 345/174 |
| 2012/0162693 A1 | 6/2012 | Ito |
| 2012/0170284 A1* | 7/2012 | Shedletsky ................... 362/355 |
| 2012/0182242 A1 | 7/2012 | Lindahl et al. |
| 2012/0182743 A1 | 7/2012 | Chou |
| 2012/0194448 A1 | 8/2012 | Rothkopf |
| 2012/0200532 A1* | 8/2012 | Powell et al. ................. 345/175 |
| 2012/0224073 A1 | 9/2012 | Miyahara |
| 2012/0246377 A1 | 9/2012 | Bhesania |
| 2012/0256959 A1 | 10/2012 | Ye et al. |
| 2012/0274811 A1 | 11/2012 | Bakin |
| 2012/0300275 A1 | 11/2012 | Vilardell et al. |
| 2013/0027354 A1* | 1/2013 | Yabuta et al. ................. 345/175 |
| 2013/0063873 A1 | 3/2013 | Wodrich et al. |
| 2013/0106813 A1* | 5/2013 | Hotelling et al. ............. 345/207 |
| 2013/0120760 A1* | 5/2013 | Raguin et al. ................. 356/612 |
| 2013/0201094 A1 | 8/2013 | Travis |
| 2013/0222353 A1 | 8/2013 | Large |
| 2013/0329301 A1 | 12/2013 | Travis |
| 2013/0332628 A1 | 12/2013 | Panay |
| 2014/0022629 A1 | 1/2014 | Powell |
| 2014/0098085 A1 | 4/2014 | Lee |

FOREIGN PATENT DOCUMENTS

| | | |
|---|---|---|
| EP | 2381290 | 10/2011 |
| JP | 10301055 | 11/1998 |
| JP | 10326124 | 12/1998 |
| JP | 2001174746 | 6/2001 |
| JP | 2009122551 | 6/2009 |
| KR | 10-2011-0064265 A | 6/2011 |
| WO | WO-9964784 | 12/1999 |
| WO | WO-0079327 | 12/2000 |

OTHER PUBLICATIONS

Travis, Adrian R., et al., "Flat Projection for 3-D", *In Proceedings of the IEEE*, vol. 94 Issue: 3, Available at <http://ieeexplore.ieee.org/stamp/stamp.jsp?tp=&arnumber=1605201>,(Mar. 2006), pp. 539-549.

"Accessing Device Sensors", retrieved from <https://developer.palm.com/content/api/dev-guide/pdk/accessing-device-sensors.html> on May 25, 2012, 4 pages.

"ACPI Docking for Windows Operating Systems", Retrieved from: <http://www.scritube.com/limba/engleza/software/ACPI-Docking-for-Windows-Opera331824193.php> on Jul. 6, 2012, 10 pages.

"Cirago Slim Case®—Protective case with built-in kickstand for (56) References Cited

OTHER PUBLICATIONS your iPhone 5®", Retrieved from <http://cirago.com/wordpress/wp-content/uploads/2012/10/ipc1500brochure1.pdf> on Jan. 29, 2013, 1 page.

"First One Handed Fabric Keyboard with Bluetooth Wireless Technology", Retrieved from: <http://press.xtvworld.com/article3817.html> on May 8, 2012,(Jan. 6, 2005), 2 pages.

"For Any Kind of Proceeding 2011 Springtime as Well as Coil Nailers as Well as Hotter Summer Season", *Lady Shoe Worlds,* retrieved from <http://www.ladyshoesworld.com/2011/09/18/for-any-kind-of-proceeding-2011-springtime-as-well-as-coil-nailers-as-well-as-hotter-summer-season/> on Nov. 3, 2011,(Sep. 8, 2011), 2 pages.

"Force and Position Sensing Resistors: An Emerging Technology", *Interlink Electronics,* Available at <http://staff.science.uva.nl/~vlaander/docu/FSR/An_Exploring_Technology.pdf>,(Feb. 1990), pp. 1-6.

"Frogpad Introduces Weareable Fabric Keyboard with Bluetooth Technology", Retrieved from: <http://www.geekzone.co.nz/content.asp?contentid=3898> on May 7, 2012,(Jan. 7, 2005), 3 pages.

"Incipio LG G-Slate Premium Kickstand Case—Black Nylon", Retrieved from: <http://www.amazon.com/Incipio-G-Slate-Premium-Kickstand-Case/dp/B004ZKP916> on May 8, 2012, 4 pages.

International Search Report and Written Opinion, International Application No. PCT/US2011/050471, (Apr. 9, 2012), 8 pages.

"Membrane Keyboards & Membrane Keypads", Retrieved from: <http://www.pannam.com/> on May 9, 2012,(Mar. 4, 2009), 2 pages.

"Microsoft Develops Glasses-Free Eye-Tracking 3D Display", *Tech-FAQ,* retrieved from <http://www.tech-faq.com/microsoft-develops-glasses-free-eye-tracking-3d-display.html> on Nov. 2, 2011, 3 pages.

"Microsoft Reveals Futuristic 3D Virtual HoloDesk Patent", Retrieved from <http://www.patentbolt.com/2012/05/microsoft-reveals-futuristic-3d-virtual-holodesk-patent.htmlt> on May 28, 2012, (May 23, 2012), 9 pages.

"Motion Sensors", *Android Developers,* retrieved from <http://developer.android.com/guide/topics/sensors/sensors_motion.html> on May 25, 2012, 7 pages.

Non-Final Office Action, U.S. Appl. No. 12/882,994, (Feb. 1, 2013), 17 pages.

Non-Final Office Action, U.S. Appl. No. 13/471,001, (Feb. 19, 2013), 15 pages.

Non-Final Office Action, U.S. Appl. No. 13/471,139, (Mar. 21, 2013), 12 pages.

Non-Final Office Action, U.S. Appl. No. 13/471,202, (Feb. 11, 2013), 10 pages.

Non-Final Office Action, U.S. Appl. No. 13/471,336, (Jan. 18, 2013), 14 pages.

Non-Final Office Action, U.S. Appl. No. 13/651,195, (Jan. 2, 2013), 14 pages.

Non-Final Office Action, U.S. Appl. No. 13/651,232, (Jan. 17, 2013), 15 pages.

Non-Final Office Action, U.S. Appl. No. 13/651,272, (Feb. 12, 2013), 10 pages.

Non-Final Office Action, U.S. Appl. No. 13/651,287, (Jan. 29, 2013), 13 pages.

Non-Final Office Action, U.S. Appl. No. 13/651,304, (Mar. 22, 2013), 9 pages.

Non-Final Office Action, U.S. Appl. No. 13/651,327, (Mar. 22, 2013), 6 pages.

Non-Final Office Action, U.S. Appl. No. 13/651,871, (Mar. 18, 2013), 14 pages.

Non-Final Office Action, U.S. Appl. No. 13/651,976, (Feb. 22, 2013), 16 pages.

Non-Final Office Action, U.S. Appl. No. 13/653,321, (Feb. 1, 2013), 13 pages.

Non-Final Office Action, U.S. Appl. No. 13/653,682, (Feb. 7, 2013), 11 pages.

Notice of Allowance, U.S. Appl. No. 13/470,633, (Mar. 22, 2013), 7 pages.

"Position Sensors", *Android Developers,* retrieved from <http://developer.android.com/guide/topics/sensors/sensors_position.html> on May 25, 2012, 5 pages.

Restriction Requirement, U.S. Appl. No. 13/471,139, (Jan. 17, 2013), 7 pages.

Restriction Requirement, U.S. Appl. No. 13/651,304, (Jan. 18, 2013), 7 pages.

Restriction Requirement, U.S. Appl. No. 13/651,726, (Feb. 22, 2013), 6 pages.

Restriction Requirement, U.S. Appl. No. 13/651,871, (Feb. 7, 2013), 6 pages.

"SolRxTM E-Series Multidirectional Phototherapy ExpandableTM 2-Bulb Full Body Panel System", Retrieved from: < http://www.solarcsystems.com/us_multidirectional_uv_light_therapy_1_intro.html > on Jul. 25, 2012,(2011), 4 pages.

"The Microsoft Surface Tablets Comes With Impressive Design and Specs", Retrieved from <http://microsofttabletreview.com/the-microsoft-surface-tablets-comes-with-impressive-design-and-specs> on Jan. 30, 2013, (Jun. 2012), 2 pages.

"Tilt Shift Lenses: Perspective Control", retrieved from http://www.cambridgeincolour.com/tutorials/tilt-shift-lenses1.htm, (Mar. 28, 2008),11 Pages.

"Virtualization Getting Started Guide", *Red Hat Enterprise Linux 6, Edition 0.2,* retrieved from <http://docs.redhat.com/docs/en-US/Red_Hat_Enterprise_Linux/6/html-single/Virtualization_Getting_Started_Guide/index.html> on Jun. 13, 2012, 24 pages.

"What is Active Alignment?", http://www.kasalis.com/active_alignment.html, retrieved on Nov. 22, 2012, 2 Pages.

Bert, et al., "Passive Matrix Addressing of Electrophoretic Image Display", *Conference on International Display Research Conference,* Retrieved from <http://www.cmst.be/publi/eurodisplay2002_s14-1.pdf>,(Oct. 1, 2002), 4 pages.

Block, Steve et al., "DeviceOrientation Event Specification", *W3C, Editor's Draft,* retrieved from <https://developer.palm.com/content/api/dev-guide/pdk/accessing-device-sensors.html> on May 25, 2012,(Jul. 12, 2011), 14 pages.

Brown, Rich "Microsoft Shows Off Pressure-Sensitive Keyboard", retrieved from <http://news.cnet.com/8301-17938_105-10304792-1.html> on May 7, 2012, (Aug. 6, 2009), 2 pages.

Burge, et al., "Determination of off-axis aberrations of imaging systems using on-axis measurements", *SPIE Proceeding,* Retrieved from <http://www.loft.optics.arizona.edu/documents/journal_articles/Jim_Burge_Determination_of_off-axis_aberrations_of_imaging_systems_using_on-axis_measurements.pdf>,(Sep. 21, 2011), 10 pages.

Butler, Alex et al., "SideSight: Multi-"touch" Interaction around Small Devices", *In The proceedings of the 21st annual ACM symposium on User interface software and technology.,* retrieved from <http://research.microsoft.com/pubs/132534/sidesight_crv3.pdf> on May 29, 2012,(Oct. 19, 2008), 4 pages.

Chang, Jee-Gong et al., "Optical Design and Analysis of LCD Backlight Units Using ASAP", *Optical Engineering,* Available at <http://www.opticsvalley.com/resources/kbasePDF/ma_oe_001_optical_design.pdf>,(Jun. 2003), 15 pages.

Crider, Michael "Sony Slate Concept Tablet "Grows" a Kickstand", Retrieved from: <http://androidcommunity.com/sony-slate-concept-tablet-grows-a-kickstand-20120116/> on May 4, 2012,(Jan. 16, 2012), 9 pages.

Dietz, Paul H., et al., "A Practical Pressure Sensitive Computer Keyboard", In Proceedings of UIST 2009,(Oct. 2009), 4 pages.

Diverdi, et al., "An Immaterial Pseudo-3D Display with 3D Interaction", *In the proceedings of Three-Dimensional Television: Capture, Transmission, and Display, Springer,* Retrieved from <http://www.cs.ucsb.edu/~holl/pubs/DiVerdi-2007-3DTV.pdf>,(Feb. 6, 2007), 26 pages.

Glatt, Jeff "Channel and Key Pressure (Aftertouch).", Retrieved from: <http://home.roadrunner.com/~jgglatt/tutr/touch.htm> on Jun. 11, 2012, 2 pages.

Grossman, et al., "Multi-Finger Gestural Interaction with 3D Volumetric Displays", In *The proceedings of the 17th annual ACM symposium on User interface software and technology,* Retrieved from <http://www.dgp.toronto.edu/papers/tgrossman_UIST2004.pdf>,(Oct. 24, 2004), 61-70.

(56) References Cited

OTHER PUBLICATIONS

Hanlon, Mike "ElekTex Smart Fabric Keyboard Goes Wireless", Retrieved from: <http://www.gizmag.com/go/5048/ > on May 7, 2012,(Jan. 15, 2006), 5 pages.

Izadi, Shahram et al., "ThinSight: A Thin Form-Factor Interactive Surface Technology", *Communications of the ACM*, vol. 52, No. 12, retrieved from <http://research.microsoft.com/pubs/132532/p90-izadi.pdf> on Jan. 5, 2012,(Dec. 2009), pp. 90-98.

Kaur, Sukhmani "Vincent Liew's redesigned laptop satisfies ergonomic needs", Retrieved from: <http://www.designbuzz.com/entry/vincent-liew-s-redesigned-laptop-satisfies-ergonomic-needs/> on Jul. 27, 2012,(Jun. 21, 2010), 4 pages.

Khuntontong, Puttachat et al., "Fabrication of Molded Interconnection Devices by Ultrasonic Hot Embossing on Thin Polymer Films", IEEE Transactions on Electronics Packaging Manufacturing, vol. 32, No. 3,(Jul. 2009), pp. 152-156.

Lee, C.M.G "Flat-Panel Autostereoscopic 3D Display", *Optoelectronics, IET*, Available at <http://ieeexplore.ieee.org/stamp/stamp.jsp?arnumber=04455550>,(Feb. 2008),pp. 24-28.

Lee, et al., "Depth-Fused 3D Imagery on an Immaterial Display", *In the proceedings of IEEE Transactions on Visualization and Computer Graphics*, vol. 15, No. 1, Retrieved from <http://ieeexplore.ieee.org/stamp/stamp.jsp?arnumber=04540094>,(Jan. 2009), 20-33.

Lee, et al., "LED Light Coupler Design for a Ultra Thin Light Guide", *Journal of the Optical Society of Korea*, vol. 11, Issue.3, Retrieved from <http://opticslab.kongju.ac.kr/pdf/06.pdf>,(Sep. 2007), 5 pages.

Linderholm, Owen "Logitech Shows Cloth Keyboard for PDAs", Retrieved from: <http://www.pcworld.com/article/89084/logitech_shows_cloth_keyboard_for_pdas.html> on May 7, 2012,(Mar. 15, 2002), 5 pages.

Liu, et al., "Three-dimensional PC: toward novel forms of human-computer interaction", In *The proceedings of Three-Dimensional Video and Display: Devices and Systems vol. CR76*, Retrieved from <http://www.google.co.in/url?sa=t&rct=j&q=Three-dimensional+PC:+toward+novel+forms+of+human-computer+interaction&source=web&cd=1&ved=0CFoQFjAA&url=http%3A%2F%2Fciteseerx.ist.psu.ed%2Fviewdoc%2Fdownload%3Fdoi%3D10.1.1.32.9469%26rep%3Drep1%26,(Nov. 5, 2000), 250-281.

McLellan, Charles "Eleksen Wireless Fabric Keyboard: a first look", Retrieved from: <http://www.zdnetasia.com/eleksen-wireless-fabric-keyboard-a-first-look-40278954.htm> on May 5, 2012,(Jul. 17, 2006), 9 pages.

Peli, Eli "Visual and Optometric Issues with Head-Mounted Displays", *IS & T/OSA Optics & Imaging in the Information Aqe*, The Society for Imaging Science and Technology, available at <http://www.u.arizona.edu/~zrui3/zhang_pHMPD_spie07.pdf>,(1996), pp. 364-369.

Post, E.R. et al., "E-Broidery: Design and Fabrication of Textile-Based Computing", IBM Systems Journal, vol. 39, Issue 3 & 4,(Jul. 2000), pp. 840-860.

Purcher, Jack "Apple is Paving the Way for a New 3D GUI for IOS Devices", Retrieved from: <http://www.patentlyapple.com/patently-apple/2012/01/apple-is-paving-the-way-for-a-new-3d-gui-for-ios-devices.html> on Jun. 4, 2012,(Jan. 12, 2012), 15 pages.

Reisman, et al., "A Screen-Space Formulation for 2D and 3D Direct Manipulation", *In the proceedings of the 22nd annual ACM symposium on User interface*, Retrieved from <http://innovis.cpsc.ucalgary.ca/innovis/uploads/Courses/TableTopDetails2009/Reisman2009.pdf>,(Oct. 4, 2009), 69-78.

Takamatsu, Seiichi et al., "Flexible Fabric Keyboard with Conductive Polymer-Coated Fibers", In Proceedings of Sensors 2011,(Oct. 28, 2011), 4 pages.

Yan, Jin-Ren et al., "Edge-Lighting Light Guide Plate Based on Micro-Prism for Liquid Crystal Display", *Journal of Display Technology*, vol. 5, No. 9, Available at <http://ieeexplore.ieee.org/ielx5/9425/5196834/05196835.pdf?tp=&arnumber=5196835&isnumber=5196834>,(Sep. 2009), pp. 355-357.

Yu, et al., "A New Driving Scheme for Reflective Bistable Cholesteric Liquid Crystal Displays", Society for Information Display International Symposium Digest of Technical Papers, Retrieved from <http://www.ee.ust.hk/~eekwok/publications/1997/bcd_sid.pdf>,(May 1997), 4 pages.

Zhang, et al., "Model-Based Development of Dynamically Adaptive Software", *In Proceedings of ICSE 2006*, Available at <http://www.irisa.fr/lande/lande/icse-proceedings/icse/p371.pdf>,(May 20, 2006), pp. 371-380.

Zhang, Rui "Design of Head Mounted Displays", Retrieved at <<http://www.optics.arizona.edu/optomech/student%20reports/2007/Design%20of%20mounteddisplays%20Zhang.pdf>>, (Dec. 12, 2007), 6 pages.

Chinese Search Report, Application No. 201110272868.3, (Apr. 1, 2013),10 pages.

Notice of Allowance, U.S. Appl. No. 12/882,994, (Jul. 12, 2013), 9 pages.

PCT Search Report, Application No. PCT/US2013/042790, (Aug. 8, 2013), 9 pages.

International Search Report, Mailed Date: Jun. 17, 2013, Application No. PCT/US2013/028479, Filed Date: Mar. 1, 2013, pp. 10.

International Search Report and Written Opinion, Application No. PCT/US2013/042550, Sep. 24, 2013, 14 pages.

Non-Final Office Action, U.S. Appl. No. 13/408,257, Dec. 5, 2013, 13 pages.

Restriction Requirement, U.S. Appl. No. 13/494,722, Dec. 20, 2013, 6 pages.

Prospero "Samsung Outs Series 5 Hybrid PC Tablet", Retrieved from: <http://blog.laptopmag.com/samsung-outs-series-5-hybrid-pc-tablet-running-windows-8> on Oct. 31, 2013, Jun. 4, 2012, 7 pages.

"Welcome to Windows 7", Retrieved from: <http://www.microsoft.com/en-us/download/confirmation.aspx?id=4984> on Aug. 1, 2013, Sep. 16, 2009, 3 pages.

"Final Office Action", U.S. Appl. No. 13/408,257, Mar. 28, 2014, 17 pages.

"Foreign Office Action", CN Application No. 201320328022.1, Feb. 17, 2014, 4 Pages.

"Restriction Requirement", U.S. Appl. No. 13/367,812, Mar. 11, 2014, 6 pages.

\* cited by examiner

SENSOR-IN-PIXEL DISPLAY SYSTEM WITH NEAR INFRARED FILTER

BACKGROUND

Some display systems operate as touch interactive screens by incorporating sensors (sensing pixels), allowing user interaction via various user inputs (such as fingers, pen, objects) touching or coming close to a portion of the screen. The sensors rely on feedback from the interacting object in visible and/or infrared spectrum depending upon the sensor type. While these systems can be very easy for users to interact with, they are not without their problems. One such problem is that it can be difficult for sensors in the display systems to determine when an object actually touches or is close to the screen due to the ambient light interference, as ambient light contains wavelengths to which the sensors are sensitive, which can lead to inaccurate inputs and user frustration with using such systems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a display system includes a cover panel and a display panel. The display panel includes both multiple display pixels and multiple sensor elements configured to detect infrared light reflected from an object within a threshold distance of the cover panel. The filter layer is configured to increase rejection of near infrared light reflected from the object prior to detection of the infrared light by the multiple sensor elements.

BRIEF DESCRIPTION OF THE DRAWINGS

The same numbers are used throughout the drawings to reference like features.

DETAILED DESCRIPTION

A sensor-in-pixel (SIP) display system with near infrared filter is discussed herein. A SIP interactive display system includes a display panel and a protective cover (e.g., glass) panel on top of the display panel. The display system includes a light source that emits infrared (IR) light outside the display panel. Objects touching or close to the protective cover reflect the IR light, and the reflected IR light is detected by the integral/discrete sensor elements in the display panel. The display system includes a filter layer that is configured to increase rejection (e.g., reflection or absorption) of near infrared light, and that can also be configured to reduce rejection of both viewable light and infrared light. The filter layer can be situated in different locations, such as between the display panel and the cover panel, within the display panel, within the cover panel, or on top of the cover panel.

Figure 1:
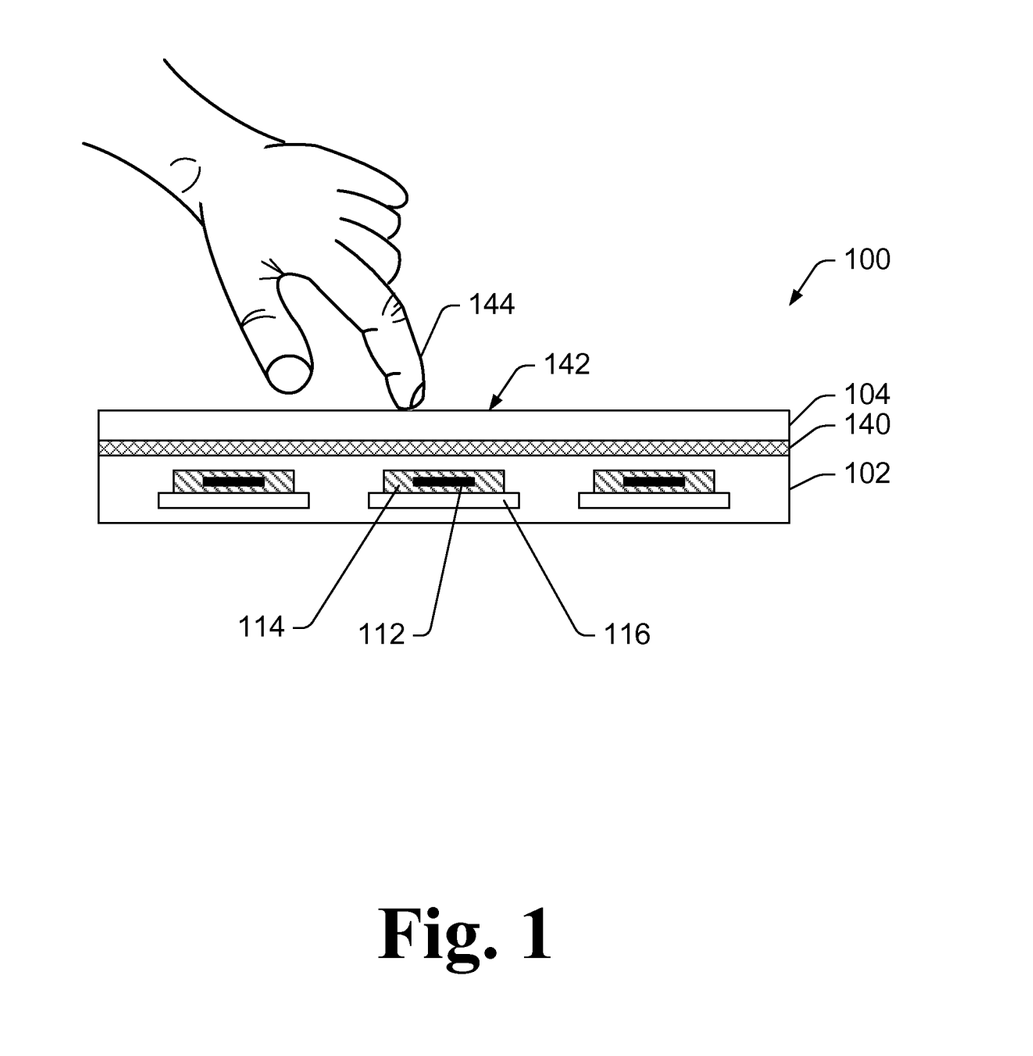
FIG. 1 illustrates a cross-section view of an example sensor-in-pixel interactive display system in accordance with one or more embodiments.

FIG. 1 illustrates a cross-section view of an example SIP interactive display system 100 in accordance with one or more embodiments. Display system 100 includes a display panel 102 and cover panel 104. Cover panel 104 is designed to protect display panel 102, and is typically separate from (but can be affixed to) display panel 102. Display system 100 supports touch inputs, allowing an object touching (or within a threshold distance) of a display surface of display system 100 to be detected, as well as optionally the motion of such an object (e.g., a gesture made by a user).

Display panel 102 can be implemented using any of a variety of different techniques. For example, display panel 102 can be a liquid crystal (LCD) display panel, a light-emitting diode (LED) display panel, an organic light-emitting diode (OLED) display panel, a plasma display panel, a flexible display panel, a transparent display panel, and so forth. It is to be appreciated that display panel 102 can include various different layers, the quantity and composition of which are dependent on the technique used to implement display panel 102.

Touch input detection is accomplished by incorporating image sensor elements into display panel 102 in a sensor-in-pixel configuration. In a sensor-in-pixel configuration, also referred to as an in-cell configuration, image sensor elements are positioned in one or more display pixels. Image sensor elements can be included in each display pixel, or alternatively a subset of display pixels. In display system 100, sensor elements 112 are positioned within display pixels 114 of display panel 102. Sensor elements 112 can be implemented in various manners, such as using Silicon-germanium sensors, infrared cameras, and so forth. Display panel 102 can also optionally include light blocking layers 116 configured to block display light from a back (or bottom) side of sensor elements 112. Touch input detection can detect various items or objects, such as a finger, a pen, a stylus, a tag (e.g., tag barcode or QR tag), and so forth.

As part of the sensor-in-pixel display system with near infrared filter discussed herein, display system 100 also includes a filter layer 140 positioned between cover panel 104 and display panel 102. Due to the environment in which display system 100 can be used, ambient lighting (as well as display light from display system 100) oftentimes includes some overlapping wavelengths in near infrared, infrared, and visible red light regions. The filter layer is used to filter out near infrared light to increase the impact of the filter, including a twice-filtered effect in some situations as discussed below. The filter layer 140 can also be used to filter some portion of visible red light, although filter layer 140 can be designed with the wavelength at which the visible red display light rolls off in mind so that the filter hugs the edge of that response so as not to filter out too much visible red light. In one or more embodiments, the filter layer is configured to increase rejection of near infrared light and also to reduce rejection of both viewable light and infrared light, as discussed in more detail below.

The filter layer can be implemented in any location between sensor elements 112 and the object for which touch is being detected. Although the filter layer can be the topmost layer of display system 100, typically the filter layer is not the topmost layer of display system 100. Not being the topmost layer of display system 100 can increase protection of the filter layer, which can provide increased longevity of the filter layer depending on the susceptibility of the filter layer to degradation due to physical usage or ultraviolet (UV) exposure. In one or more embodiments, the filter layer is a layer within multiple layers or panels of cover panel 104. In one or more embodiments the filter layer is included as part of display panel 102 rather than being positioned between cover panel 104 and display panel 102, as discussed in more detail below with reference to FIG. 4.

Figure 2:
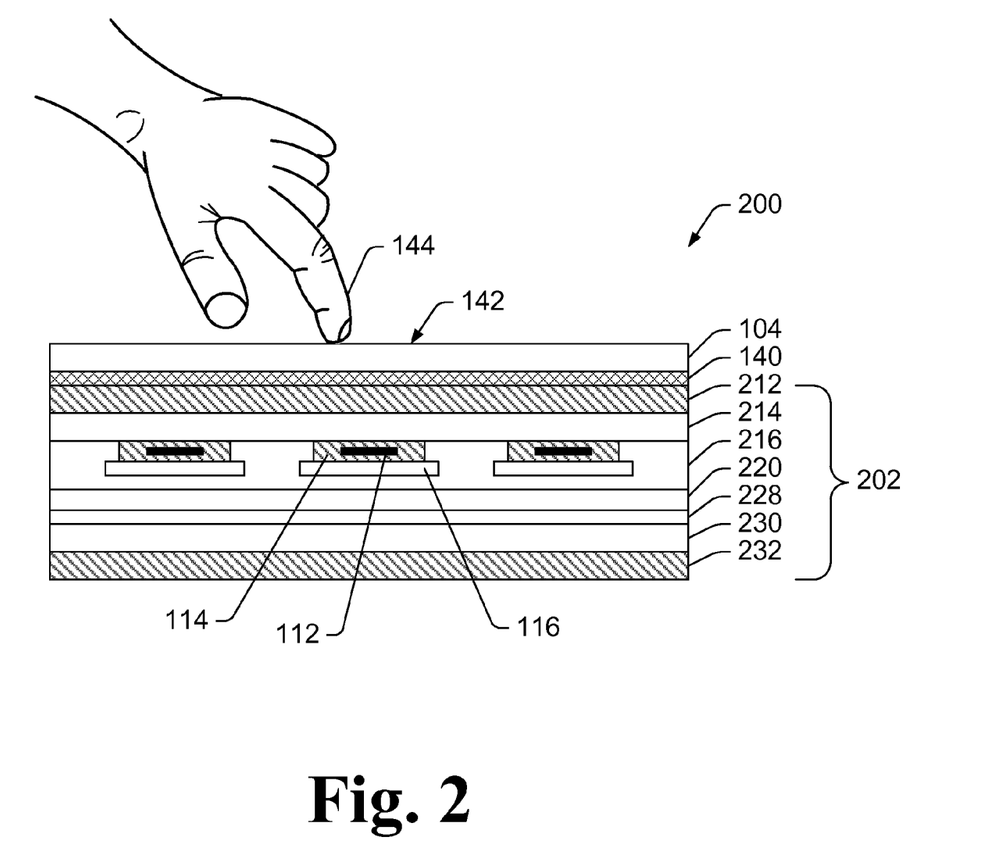
FIG. 2 illustrates a cross-section view of another example sensor-in-pixel interactive display system in accordance with one or more embodiments.

FIG. 2 illustrates a cross-section view of another example SIP interactive display system 200 in accordance with one or more embodiments. Display system 200 includes a display panel 202, which is a specific example of a display panel 102 of FIG. 1. Display system 200 also includes cover panel 104 and filter layer 140 as discussed above with reference to FIG. 1. Display system 200 supports touch inputs, analogous to display system 100 of FIG. 1. Touch input detection is accomplished by incorporating image sensor elements 112 into display panel 202 in a sensor-in-pixel configuration.

Display panel 202 includes a top polarizer 212, a top glass substrate 214, and a top RGB (Red Green Blue) color filter layer 216. RBG color filter layer 216 is configured to provide electrical interconnection for display panel 202. In one or more embodiments, RBG color filter layer 216 includes one or more interconnected integrated circuits. Display panel 202 also includes liquid crystal layer 220 (which is a liquid rather than physical solid layer). Sensor elements 112 are positioned within display pixels 114 of RGB color filter layer 216 above light blocking layers 116. Light blocking layers 116 are configured to block display light from a back (or bottom) side of sensor elements 112. Display panel 202 also includes a bottom trace layer 228, a bottom glass substrate 230, and a bottom polarizer 232.

It should be noted that the sizes of layers and features of display system 200 can vary for purposes of explanation, and are not necessarily to scale in FIG. 2. Additionally, display panel 202 is discussed as a liquid crystal display, although it is to be appreciated that other types of display technology can alternatively be used, as discussed above.

Returning to FIG. 1, cover panel 104 is a protective cover over display panel 102. Cover panel 104 can be, but need not be, bonded or laminated to display panel 102. Cover panel 104 can be a glass cover, such as a Corning® Gorilla® Glass cover available from Corning, Inc. of Corning, N.Y., or glass covers available from the Asahi Glass Company of Tokyo, Japan, or SCHOTT North America, Inc. of Elmsford, N.Y. Alternatively, cover panel 104 can be a traditional soda lime glass cover, or made of materials other than glass. For example, cover panel 104 can be a plastic cover, a polymer sheet having a top hard coating, a removable polymer sheet in addition to (or in place of) a glass cover, a polymer sheet providing reduced friction (e.g., by being slightly "bumpy") for touch and drag motions or other gestures, combinations thereof, and so forth.

Cover panel 104 has a display surface 142 that displays images produced by display panel 102. Display surface 142 is also the surface via which inputs are received, such as by the user placing a finger or other object within a threshold distance of (or touching) display surface 142. An example finger 144 touching display surface 142 is illustrated in FIG. 1, although it should be noted that various other objects can be used to touch display surface 142 (e.g., a pen, a stylus, a tag barcode or QR tag, and so forth). Although a single cover panel 104 is illustrated in FIG. 1, it should be noted that display system 100 can alternatively include any number of protective covers, and that filter layer 140 can be positioned between display panel 102 and any one or more of multiple protective covers. For example, display system 100 can include multiple protective cover panels (e.g., one cover panel that is a removable polymer sheet on top of another cover panel that is a glass cover), and filter layer 140 can be positioned between the multiple protective cover panels.

Various aspects of display system 100 are discussed with reference to a top and a bottom. The top refers to the direction or position closer to display surface 142, and the bottom refers to the direction or position further from display surface 142. For example, the bottom of filter layer 140 is adjacent to the top of display panel 102.

In one or more embodiments, display system 100 includes a reflective surface at the bottom of or below display panel 102. This reflective surface can be included as part of display panel 102 or separate from display panel 102. This reflective surface allows visible light to be reflected to assist a user in viewing images produced by display panel 102. Alternatively, display system 100 can include one or more visible light sources to assist a user in view images produced by display panel 102, such as a light source (e.g., LEDs) below display panel 102 emitting light in visible wavelengths, a light source (e.g., LEDs) along one or more sides of display panel 102 emitting light in visible wavelengths, and so forth. Backlit illumination of display system 100 can be achieved using such light sources in the form of an array of sources or arrays of sources coupled into a light guide plate (LGP) which can deliver the light to the back side of display panel 102. Alternatively, light may be delivered through a front lightguide (e.g., positioned above display panel 102).

Display system 100 also includes one or more infrared (IR) light sources that emit light in IR wavelengths (e.g., 810 nm to 890 nm). This IR light is emitted towards display surface 142, and can be reflected by an object touching or within a threshold distance of display surface 142. This reflected IR light is sensed by one or more sensor elements 112. The IR light sources can be LEDs or other IR light generating components. The IR light sources can be located below display panel 102, or alternatively the IR light sources can be situated in other locations, such as along one or more sides of display panel 102 (e.g., being delivered via an LGP), above display panel 102 (as a front light illumination), within display panel 102, and so forth.

An object being within a threshold distance of display surface 142 refers to the object being close enough to display surface 142 for the IR light to be reflected by the object and sensed by one or more sensor elements 112. This threshold distance can vary based on various factors, such as the intensity of the IR light emitted by the IR light sources, the sensitivity of the sensor elements 112, the number of layers or panels of display system 100 that the IR light passes through, the spatial periodicity of the sensor array, the z distance from the sensor array plane to the object, and so forth. For example, the threshold distance may be on the order of 1-10 millimeters, although can alternatively be other distances.

There is a tradeoff between the resolvability (or image contrast) of an object's features, the array spacing of the sensor array, and the z separation distance between the object and the sensor array plane. Objects located near the sensor array plane can be resolved at the spatial resolution of the sensor array with fairly high contrast. However, if thickness is added to the cover panel layers above the sensor array plane, or if the object distance from the display surface is increased, the contrast of object features at the spatial frequency (which is the inverse of the spatial domain) of the sensor array image will be reduced. This implies that sensor spacing is to be set small enough to capture desired spatial frequency content of the object features when placed at a given distance from the sensor array plane where such content is desired to be captured by the sensor image.

It should be noted that if there is a minimum thickness required of the cover panel in order to meet mechanical robustness or other desires for the display panel, there will be a minimum sensor spacing below which does not contribute significantly toward increasing image contrast. Conversely, the given spatial frequency content of an object that is desired to be resolved at a given level of contrast dictates the maximum thickness allowable of the cover panel for higher spatial frequencies approaching that of the sensor array spatial frequency, and dictates the maximum object to sensor plane total distance allowable for lower spatial frequencies. For example, if the sensor array has a grid pattern spacing of 461 µm, and a tag object has a line-on-line-off (LOLO) periodic pitch of 8 mm (4 mm dots), or in other words a spatial frequency of 0.125 line pairs per millimeter, then a cover panel thickness on order of 1.75 mm will not significantly affect the contrast of such object content. However, if the tag object has a LOLO pitch of 3 mm (1.5 mm dots), or a spatial frequency of 0.33 line pairs per millimeter, then a cover panel thickness on order of 1.75 mm may reduce the image contrast by as much as 50%. As noted above, there is then a continuum relation between spatial frequencies of an object which can be resolved at a given level of contrast, and the distance of that object to the imaging sensor plane, and spacing of the sensors within the sensor array. It should also be noted that fingertips typically require less spatial frequency content than typical low to higher resolution tags. As such, a display panel may be designed with the parameters in mind to function appropriately with the object feature sizes expected to be used with that display panel.

It should further be noted that, depending on the location of IR light sources, light blocking layers 116 may not be included in display panel 102. For example, if the IR light source is below display panel 102, then display panel 102 typically includes light blocking layers 116 to block the IR light provided by the IR light sources (but still detect IR light reflected by an object touching or within a threshold distance of display surface 142). By way of another example, if the IR light source is along one or more sides of display panel 102 (or above display panel 102) and direct IR light provided by the IR light sources is not directed towards sensor elements 112, then light blocking layers 116 may not be included in display panel 102.

Display system 100 also includes a filter layer 140, positioned between cover panel 104 and display panel 102. Filter layer 140 is configured to increase rejection of near infrared light and also to reduce rejection of both viewable light and infrared light. However, filter layer 140 may reject some viewable light (e.g., viewable red light in wavelengths that are sensed by sensor elements 112), but reduces rejection of most viewable light so as not to interfere with the display viewed by the user. For example, the spectrum of viewable light from a sample display panel 102 can be measured to identify at what wavelengths the display light falls off, and red light wavelengths within a threshold number of nanometers (e.g., within 5 nm) and higher wavelengths can be rejected by the filter layer. E.g., if the red portion of the spectrum of display light starts to roll off significantly by 650 nm, then viewable light at 650 nm or above (or alternatively 645 nm or above, or 640 nm or above) can be rejected. Viewable light can be rejected in different manners, such as by isolation along wavelength, or by use of partial transmission (e.g., 70% transmission of viewable light at or within a threshold number of nanometers of 650 nm, 50% transmission of viewable light at or within a threshold number of nanometers of 680 nm, and so forth).

Filter layer 140 can reject light in particular wavelengths by reflecting or absorbing the light in those particular wavelengths. Increasing rejection of near infrared light refers to increasing the amount of near infrared light that is not passed through filter layer 140, while reducing rejection of both viewable light and infrared light refers to decreasing the amount of viewable light and infrared light that is absorbed or reflected by filter layer 140. Near infrared light as discussed herein refers to light in wavelengths between the wavelengths of visible light and the wavelengths of infrared light being provided by the infrared light source of display system 100. For example, near infrared light can be light having wavelengths in the 680 nanometer (nm) to 810 nm range.

By increasing rejection of near infrared light, the ambient light that is near infrared light that may be passed through to the infrared sensor elements 112 is reduced (or eliminated), preventing such ambient light from being incorrectly sensed by the sensor elements as reflected infrared light. By reducing rejection of viewable light, any light generated or reflected by display panel 102 for display by a liquid crystal or other layer of display panel 102 passes through (and is not interfered with by) filter layer 140. By reducing rejection of infrared light, any infrared light being provided by the infrared light source of display system 100 passes through (and is not interfered with by) filter layer 140, allowing the infrared light to be reflected by objects touching or close to display surface 142 and sensed by the sensor elements as reflected infrared light.

In one or more embodiments, filter layer 140 is a notch cut filter that rejects near infrared light having wavelengths from approximately 680 nm to 810 nm. Filter layer 140 also allows high transmission of visible light having wavelengths from approximately 400 nm to 420 nm up to and including visible red light having wavelengths from approximately 610 nm to 670 nm or 680 nm, as well as high transmission of infrared light having wavelengths from approximately 810 nm to 890 nm.

It should be noted that the wavelengths of light that filter layer 140 allows and rejects can vary depending on the responsiveness of sensor elements 112. Filter layer 140 rejects near infrared light in a range of wavelengths to which sensor elements 112 respond (the wavelengths of light that can be sensed by sensor elements 112). In one or more embodiments, sensor elements 112 respond to light in the range from approximately 590 nm to 870 nm. In such embodiments, filtering layer 140 rejects near infrared light having wavelengths from approximately 680 nm to 810 nm. However, if sensor elements 112 were to respond to light in the range from 800 nm to 870 nm, then filtering layer 140 can reject near infrared light having wavelengths from approximately 800 nm to 810 nm. If sensor elements 112 do not respond to light in particular near infrared wavelengths, then filter layer 140 need not (but alternatively can) reject light in wavelengths to which sensor elements 112 do not respond.

Filter layer 140 can be implemented in various manners, such as using a dielectric stack, one or more light absorbing dyes, combinations thereof, and so forth. In one or more embodiments, if sensor elements 112 respond to light at wavelengths above the wavelengths of light provided by the infrared light sources (e.g., greater than 890 nm), then filter layer 140 includes a dielectric stack or dichroic layer that rejects light above the wavelengths of light provided by the infrared light source of display system 100. However, if sensor elements 112 do not respond to light at wavelengths above the wavelengths of light provided by infrared light sources (e.g., greater than 890 nm), then filter layer 140 need include no such dielectric stack or dichroic layer.

In one or more embodiments, filter layer 140 is implemented using one or more light absorbing dyes. In one or more embodiments, filter layer 140 is implemented using Epolin 4037 and Epolin 5548 (or Spectre S300) dyes, available from Epolin, Inc. of Newark, N.J. For example, filter layer 140 can be implement by screen printing using a mixture of two inks appropriate for achieving good filtering of near infrared light, such as a mixture of E4037 at 0.2× the ink absorption spectra and Spectre S300, or E5548, at 0.07× the ink absorption spectra, with the screen printing using 230 mesh to provide four print passes to achieve the final layer. Note that various levels of sharpness of the cutoff edges on low and high wavelength transition points may be achieved by use of fewer or greater numbers of passes, or lower or higher density of the ink for a given number of passes, with sharpness of the cutoff edges on low and high wavelength transition points typically increasing as the number of passes increases and/or the density of the ink increases. Alternatively filter layer 140 can be implemented using other dyes, such as Epolin 9194 and Epolin 6818, available from Epolin, Inc.

Figure 3:
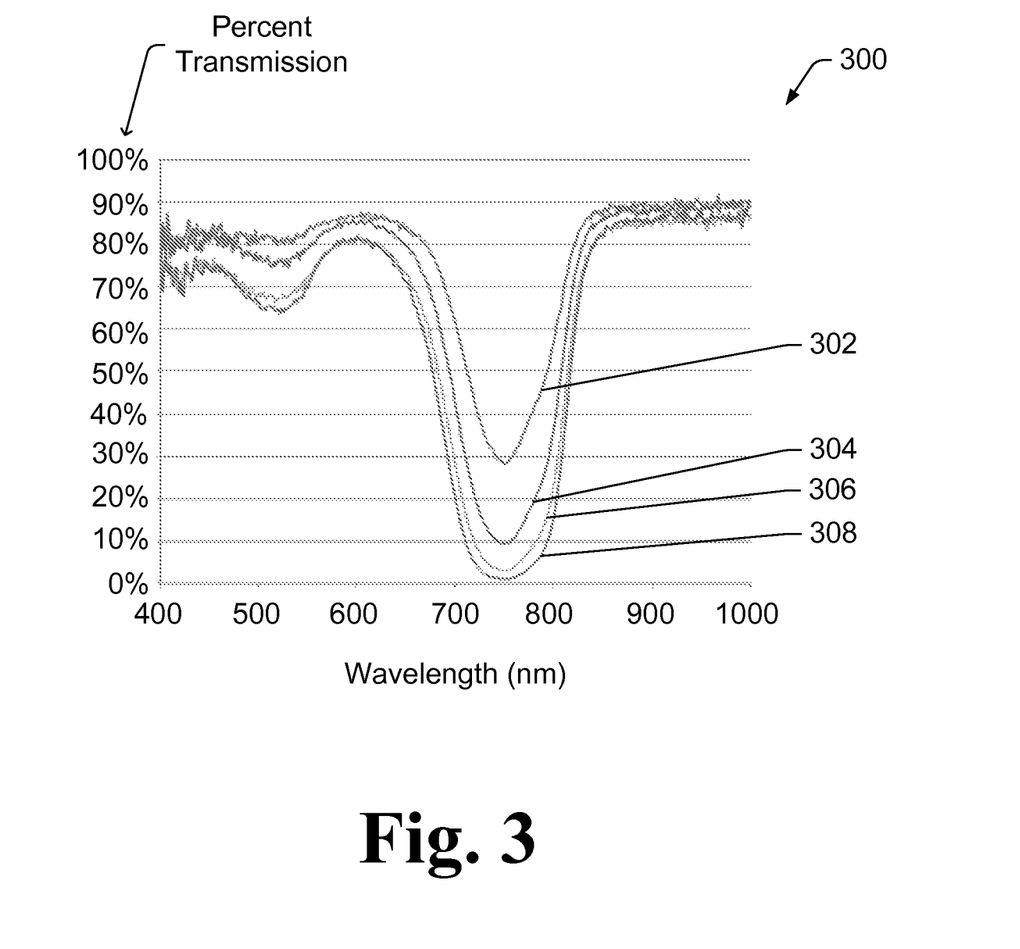
FIG. 3 illustrates an example of light transmission characteristics of an example filter in accordance with one or more embodiments.

FIG. 3 illustrates an example of light transmission characteristics of an example filter in accordance with one or more embodiments. FIG. 3 includes a graph 300 having a vertical axis identifying a percent of light transmission and a horizontal axis identifying particular light wavelengths in nanometers (nm). Graph 300 illustrates an example of the light transmission characteristics of a filter layer 140 of FIG. 1, and includes four graph lines. Graph line 302 identifies the light transmission characteristics of a filter layer 140 screen printed using a single pass. Graph line 304 identifies the light transmission characteristics of a filter layer 140 screen printed using two passes. Graph line 306 identifies the light transmission characteristics of a filter layer 140 screen printed using three passes. Graph line 308 identifies the light transmission characteristics of a filter layer 140 screen printed using four passes.

Returning to FIG. 1, filter layer 140 can be incorporated into display system 100 in a variety of different manners. In one or more embodiments, cover panel 104 is affixed (e.g., laminated or bonded) to display panel 102, and filter layer 140 is screen-printed on the bottom side of cover panel 104 prior to the affixing of cover panel 104 to display panel 102. This screen printing of filter layer 140 is screen printing a film having one or more light absorbing dyes on the bottom side of cover panel 104 so that the filter layer is situated between cover panel 104 and display panel 102.

Alternatively, filter layer 140 can be added to the top side of display panel 102 (e.g., the top of top polarizer 212 of FIG. 2) prior to affixing of cover panel 104 to display panel 102. Filter layer 140 can be screen-printed on the top side of display panel 102, or otherwise included in a top layer of display panel 102. For example, filter layer 140 can be one or more coatings added to top polarizer 212 of FIG. 2.

Alternatively, filter layer 140 can be an additional film layer comprised of various film materials. This additional film layer can be a polymer substrate (e.g., polyethylene terephthalate (PET) film) on which the one or more light absorbing dyes are screen-printed. This additional film layer can alternatively be a polymer or inorganic coating compounded with the one or more light absorbing dyes to form sheet media having the absorbing characteristics of the one or more light absorbing dyes. Regardless of how generated, this additional film layer can be affixed (e.g., laminated or bonded) to cover panel 104 (or display panel 102) prior to cover panel 104 being affixed to display panel 102.

In one or more embodiments, this additional film layer is wetted with an adhesive, allowing the additional film layer to be affixed to the top of display panel 102. The adhesive can be a reworkable adhesive, allowing the additional film layer to be affixed but also removed from the top of display panel 102. Optionally adhesive can be applied to only a portion of the additional film layer, such as along a border of the additional film layer. In situations in which the display panel 102 includes a bezel around the display border, the additional film layer can be cut to size to be inset within the bezel, or alternatively the additional film layer can be affixed to display panel 102 prior to the bezel being added to display panel 102.

Alternatively, filter layer 140 can be an adhesive mixed with the one or more light absorbing dyes to form an adhesive having the absorbing characteristics of the one or more light absorbing dyes. This adhesive can be used to laminate or otherwise affix cover panel 104 to display panel 102.

Filter layer 140 is illustrated in FIG. 1 as being situated between cover panel 104 and display panel 102. Alternatively, filter layer 140 can be situated on top of cover panel 104 or between multiple cover panels or layers of cover panel 104. In such situations, filter layer 140 can be incorporated into display system 100 in any of the various manners discussed above (e.g., screen printing, additional film layer, mixed with adhesive, etc.). For example, filter layer can be screen printed on or an additional film layer affixed to the bottom of a removable polymer cover sheet that is one of multiple cover panels or layers of cover panel 104.

In one or more embodiments, filter layer 140 is a blanket filter. A blanket filter refers to all portions of the filter having approximately the same light absorption and reflection characteristics. Alternatively, filter layer 140 can be a patterned filter. A patterned filter refers to the filter being patterned so that different portions of the filter have different light absorption and reflection characteristics. The filter can be patterned so that portions of filter layer 140 above sensor elements 112 reject near infrared light, and other portions of filter layer 140 that are not above sensor elements 112 do not reject near infrared light. The filter can also be patterned so that portions of filter layer 140 not directly above sensor elements 112 but within a threshold distance (e.g., 10% of the diameter or width of sensor elements 112) reject near infrared light to account for the spread of light due to the distance between filter layer 140 and sensor elements 112.

In some situations, display system 100 includes visible light sources located below display panel 102 or otherwise located so that the light passes through filter layer 140 prior to passing through cover panel 104. In such situations, the visible light provided by the visible light sources is filtered by filter layer 140 as the light travels from the light source through filter layer 140 and then through cover panel 104. Any light that is reflected back to display panel 102 (e.g., by a finger 144 or other object above cover panel 104) also passes through filter layer 140. Accordingly, any light provided by such a visible light source of display system 100 and reflected back to display panel 102 is filtered twice to reduce any near infrared light that is passed to sensor elements 112—once as the light travels from the light source "out" of display system 100, and again as the reflected light travels from the source of reflection to display panel 102. Further, if sensor elements 112 exhibit sensitivity for red visible light, a partial filtering of red light may be used to diminish red visible display light going into the sensors by achieving the same twice-filtered effect for such overlap between sensor response and visible display light.

Figure 4:
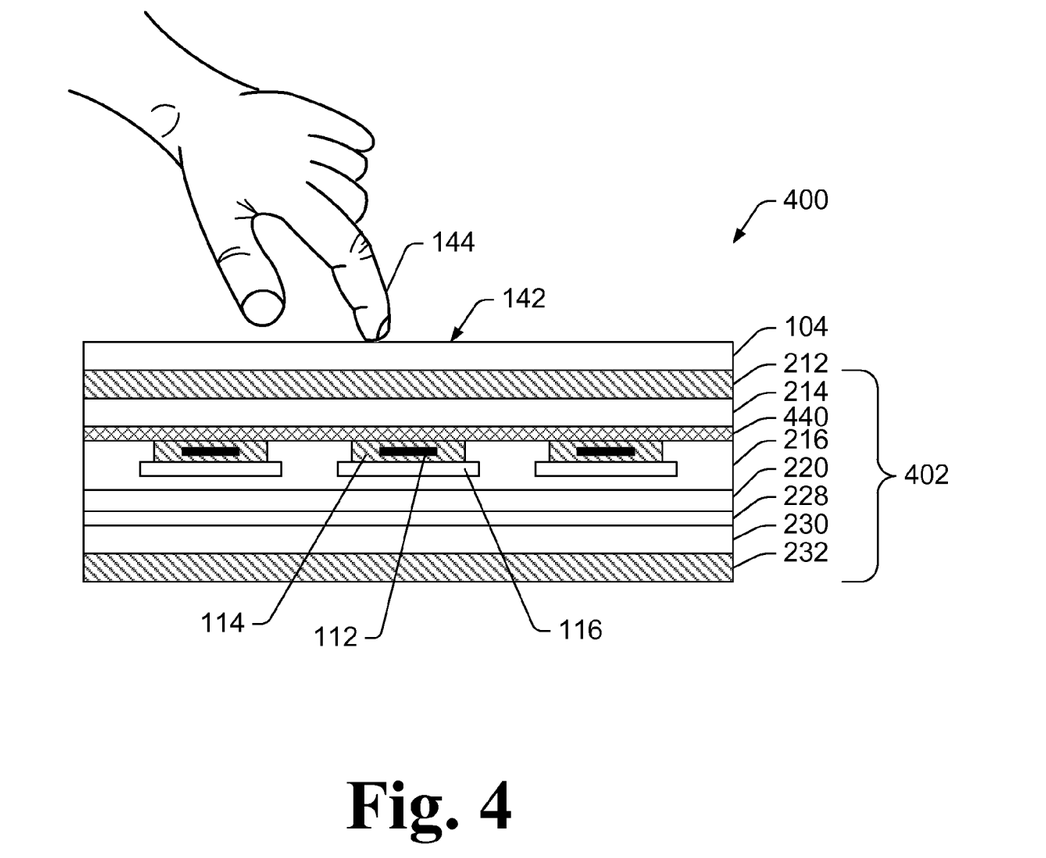
FIG. 4 illustrates a cross-section view of another example sensor-in-pixel interactive display system in accordance with one or more embodiments.

FIG. 4 illustrates a cross-section view of another example SIP interactive display system 400 in accordance with one or more embodiments. Display system 400 includes a display panel 402, which is a specific example of a display panel 102 of FIG. 1. Display system 400 also includes cover panel 104 having a display surface 142 that displays images produced by display panel 402, as discussed above with reference to FIG. 1. Display system 400 is similar to display system 100 of FIG. 1 and display system 200 of FIG. 2, but differs in that display system 400 includes a filter layer 440 that is included as part of display panel 402 rather than being positioned between display panel 402 and cover panel 104.

Display system 400 supports touch inputs, analogous to display system 100 of FIG. 1 and display system 200 of FIG. 2. Display panel 402 includes a top polarizer 212, a top glass substrate 214, and a top RBG color filter layer 216. RBG color filter layer 216 is configured to provide electrical interconnection for display panel 402. Display panel 402 also includes liquid crystal layer 220. Sensor elements 112 are positioned within display pixels 114 of RBG color filter layer 216 above light blocking layers 116. Light blocking layers 116 are configured to block display light from a back (or bottom) side of sensor elements 112. Display panel 402 also includes a bottom trace layer 228, a bottom glass substrate 230, and a bottom polarizer 232.

It should be noted that the sizes of layers and features of display system 400 can vary for purposes of explanation, and are not necessarily to scale in FIG. 4. Additionally, display panel 402 is discussed as a liquid crystal display, although it is to be appreciated that other types of display technology can alternatively be used.

Display system 400 also includes a filter layer 440. Filter layer 440 is configured to increase rejection of near infrared light and also to reduce rejection of both viewable light and infrared light, analogous to filter layer 140 of FIG. 2. Filter layer 440 is typically a patterned filter, patterned so that different portions of the filter have different light absorption and reflection characteristics. The patterned filter is patterned so that portions of filter layer 440 above sensor elements 112 reject near infrared light and may also include rejection of other wavelengths of light that sensor elements 112 are sensitive to (e.g., red visible light), and other portions of filter layer 440 that are not above sensor elements 112 do not reject near infrared light. Alternatively, filter layer 440 can be a blanket filter.

Figure 5:
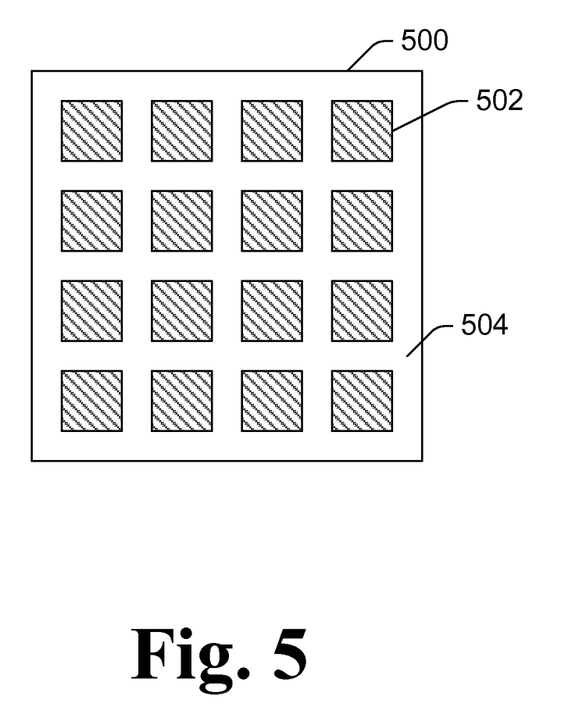
FIG. 5 illustrates an example top view of a patterned filter layer in accordance with one or more embodiments.

FIG. 5 illustrates an example top view of a patterned filter layer 500 in accordance with one or more embodiments. Patterned filter layer 500 can be a filter layer 440 of FIG. 4, or filter layer 140 of FIG. 1 or FIG. 2. Patterned filter layer 500 includes portions 502 configured to increase rejection of particular wavelengths of light. These portions 502 are illustrated with cross-hatching in FIG. 5. Patterned filter layer 500 also includes portions 504 that are not configured to increase rejection of particular wavelengths of light. These portions 504 are illustrated without cross-hatching in FIG. 5. Thus, patterned filter layer 500 is configured to increase rejection of particular wavelengths of light in some areas, but not other areas.

Portions 502 configured to increase rejection of particular wavelengths of light are positioned on top of sensor elements 112 (of FIG. 1, FIG. 2, or FIG. 4). Although illustrated as rectangles in FIG. 5, it should be noted that portions 502 can have different geographic shapes (typically the same geographic shape as the sensor elements 112).

Returning to FIG. 4, by using a patterned filter as filter layer 440, light reflected from finger 144 (or other objects) passing through a location of filter layer 440 above a sensor element 112 is filtered to increase rejection of particular wavelengths of light. These particular wavelengths of light can be, for example, wavelengths other than infrared light wavelengths (e.g., wavelengths less than approximately 810 nm and wavelengths greater than approximately 890 nm). However, light reflected from finger 144 (or other objects) passing through a location of filter layer 440 that is not above a sensor element 112 is not filtered to increase rejection of those particular wavelengths of light.

It should be noted that the wavelengths of light that filter layer 440 allows and rejects can vary depending on the responsiveness of sensor elements 112. Filter layer 440 rejects light, other than infrared light, in a range of wavelengths to which sensor elements 112 respond. In one or more embodiments, sensor elements 112 respond to light in the range from approximately 590 nm to 870 nm. In such embodiments, filtering layer 440 rejects light having wavelengths from approximately 590 nm to 810 nm. However, if sensor elements 112 were to respond to light in the range from 800 nm to 870 nm, then filtering layer 440 can reject near infrared light having wavelengths from approximately 800 nm to 810 nm. If sensor elements 112 do not respond to light in particular near infrared wavelengths, then filter layer 440 need not (but alternatively can) reject light in wavelengths to which sensor elements 112 do not respond.

Filter layer 440 can be implemented in various different manners, such as using a dielectric stack, one or more light absorbing dyes, combinations thereof, and so forth, analogous to filter layer 140 of FIG. 1 or FIG. 2. Due to angular response of a typical dielectric stack, a combination case of dielectric stack and light absorbing dye may include use of the dielectric stack for filtering the wavelengths above the wavelengths provided by the IR source, while filtering near infrared light by absorption.

Although discussed herein with reference to infrared light, it should be noted that sensor elements can alternatively be configured to respond to (sense) light of other wavelengths (e.g., certain ultraviolet wavelengths). In such situations, the filter layer (e.g., filter layer 140 of FIG. 1 or FIG. 2, or filter layer 440 of FIG. 4) is configured to reject light other than light of the desired wavelengths (e.g., particular ultraviolet wavelengths, but not near ultraviolet or visible light wavelengths).

Figure 6:
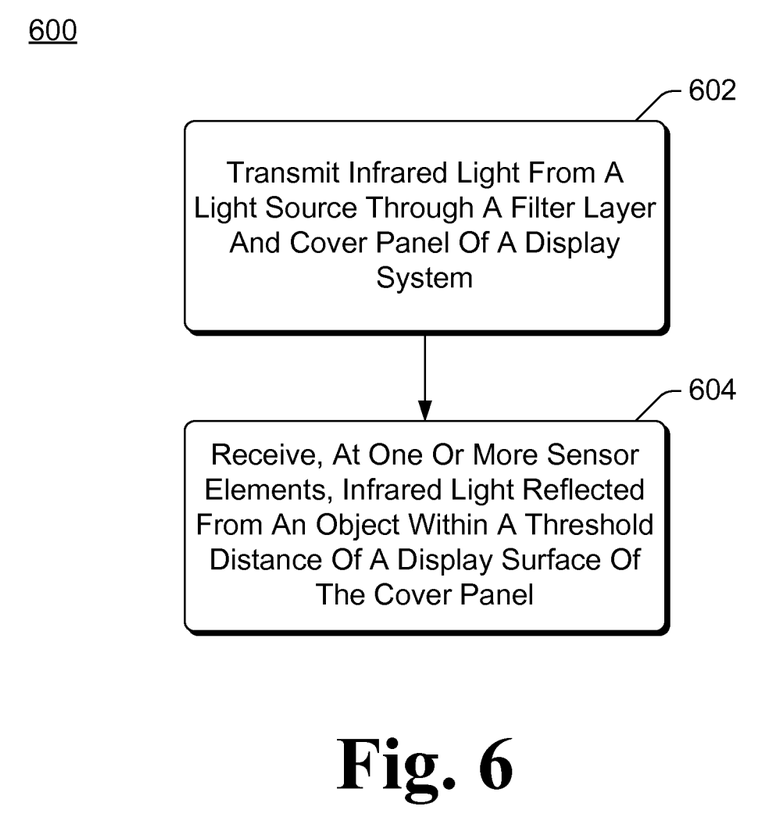
FIG. 6 is a flowchart illustrating an example process for using a sensor-in-pixel display system with near infrared filter in accordance with one or more embodiments.

FIG. 6 is a flowchart illustrating an example process 600 for using a sensor-in-pixel display system with near infrared filter in accordance with one or more embodiments. Process 600 is carried out by a display system, such as display system 100 of FIG. 1, display system 200 of FIG. 2, or display system 400 of FIG. 4, and can be implemented in software, firmware, hardware, or combinations thereof. Process 600 is shown as a set of acts and is not limited to the order shown for performing the operations of the various acts. Process 600 is an example process for using a sensor-in-pixel display system with near infrared filter; additional discussions of using a sensor-in-pixel display system with near infrared filter are included herein with reference to different figures.

In process 600, infrared light is transmitted from a light source through a filter layer and cover panel of a display system (act 602). The filter layer can be positioned between the filter cover panel and a display panel, or alternatively positioned within the display panel, as discussed above. The filter layer is configured to increase rejection of near infrared light, and can also be configured to reduce rejection of both viewable light and infrared light as discussed above.

Infrared light reflected from an object within a threshold distance of a display surface of the cover panel is received at one or more sensor elements (act 604). These one or more sensor elements are included in pixels of the display panel of the display system, as discussed above. The infrared light received at the one or more sensor elements is filtered by the filter layer, as discussed above.

Figure 7:
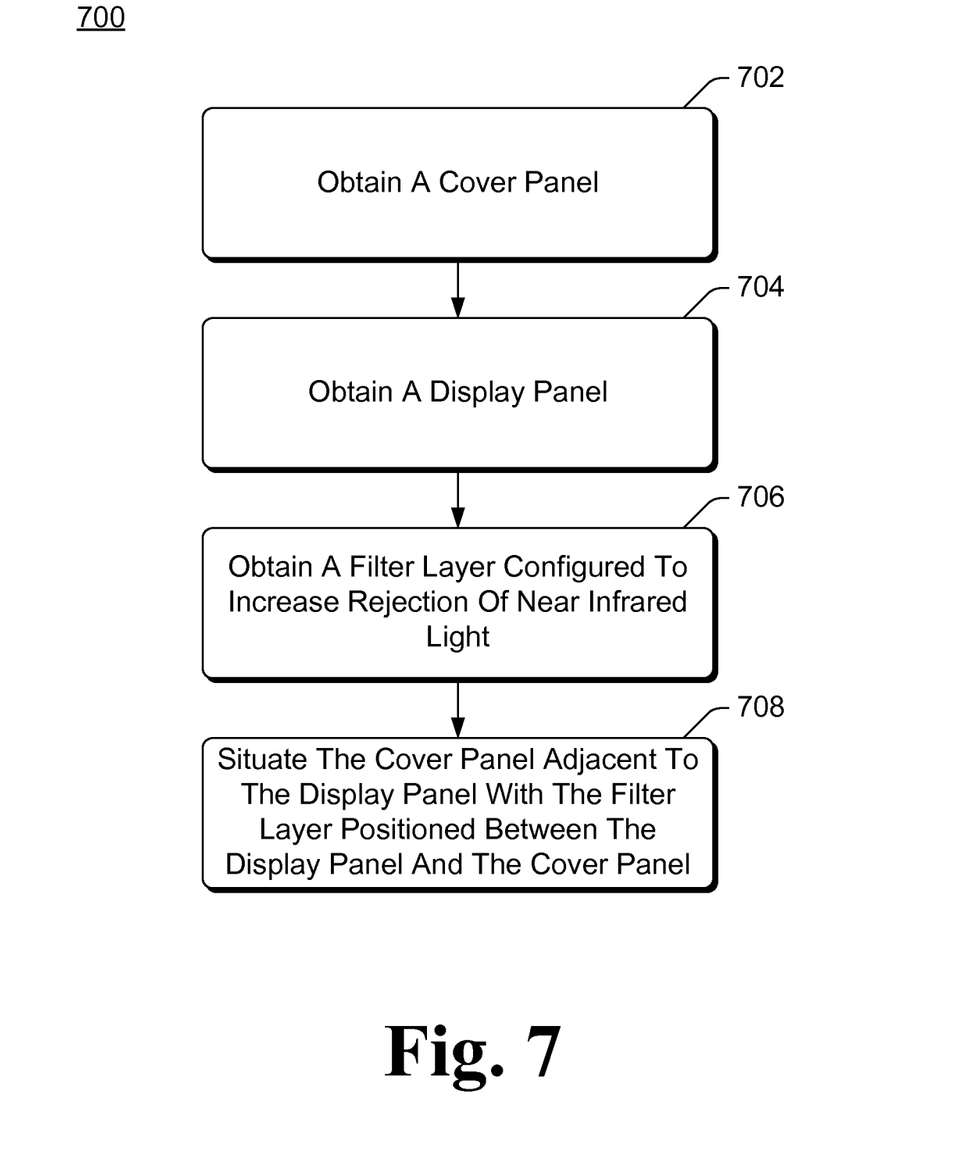
FIG. 7 is a flowchart illustrating an example process for building a sensor-in-pixel display system with near infrared filter in accordance with one or more embodiments.

FIG. 7 is a flowchart illustrating an example process 700 for building a sensor-in-pixel display system with near infrared filter in accordance with one or more embodiments. Process 700 is carried out by one or more manufacturing systems, such as a manufacturing system controlled by one or more computing devices or control components. For example, various manufacturing systems can be controlled by a computing device (such as computing device 800 of FIG. 8 discussed below) or other hardware component (e.g., an application-specific integrated circuit (ASIC), field-programmable gate array (FPGA), complex programmable logic device (CPLD), and so forth). Process 700 is shown as a set of acts and is not limited to the order shown for performing the operations of the various acts. Process 700 is an example process for building a sensor-in-pixel display system with near infrared filter; additional discussions of building a sensor-in-pixel display system with near infrared filter are included herein with reference to different figures.

In process 700, a cover panel is obtained (act 702). This cover panel is a protective cover to be positioned over a display panel, as discussed above.

A display panel is also obtained (act 704). This display panel includes various layers and incorporates image sensor elements in a sensor-in-pixel configuration, as discussed above.

A filter layer configured to increase rejection of near infrared light is obtained (act 706). This filter layer can also be configured to reduce rejection of both viewable light and infrared light, and can be implemented in a variety of different manners as discussed above.

The cover panel is situated adjacent to the display panel with the filter layer positioned between the display panel and the cover panel (act 708). The cover panel can be affixed to the display panel in various manners, such as being laminated or bonded as discussed above, or alternatively can be situated adjacent to the display panel without being bonded or laminated to the display panel.

Figure 8:
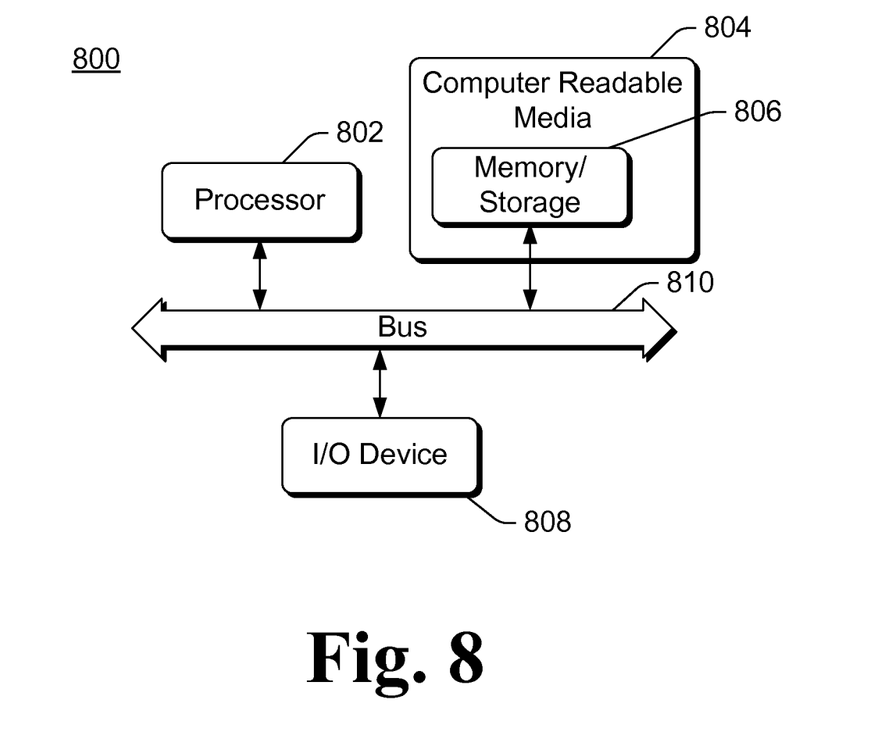
FIG. 8 illustrates an example computing device that can be configured to implement a sensor-in-pixel display system with near infrared filter in accordance with one or more embodiments.

FIG. 8 illustrates an example computing device 800 that can be configured to implement a sensor-in-pixel display system with near infrared filter in accordance with one or more embodiments. Computing device 800 can be any of a variety of different types of devices, such as a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, and so forth. Computing device 800 can also be configured to control a manufacturing system building a sensor-in-pixel display system with near infrared filter.

Computing device 800 includes one or more processors 802, one or more computer readable media 804 which can include one or more memory and/or storage components 806, one or more input/output (I/O) devices 808, and a bus 810 that allows the various components and devices to communicate with one another. Computer readable media 804 and/or one or more I/O devices 808 can be included as part of, or alternatively may be coupled to, computing device 800. Processor 802, computer readable media 804, one or more of devices 808, and/or bus 810 can optionally be implemented as a single component or chip (e.g., a system on a chip). Bus 810 represents one or more of several types of bus structures, including a memory bus or memory controller, a peripheral bus, an accelerated graphics port, a processor or local bus, and so forth using a variety of different bus architectures. Bus 810 can include wired and/or wireless buses.

Memory/storage component 806 represents one or more computer storage media. Component 806 can include volatile media (such as random access memory (RAM)) and/or non-volatile media (such as read only memory (ROM), Flash memory, optical disks, magnetic disks, and so forth). Component 806 can include fixed media (e.g., RAM, ROM, a fixed hard drive, etc.) as well as removable media (e.g., a Flash memory drive, a removable hard drive, an optical disk, and so forth).

One or more input/output devices 808 allow a user to enter commands and information to computing device 800, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth. Input/output devices 808 can include a display system 100 of FIG. 1, a display system 200 of FIG. 2 and/or display system 400 of FIG. 4.

Computing device 800 can implement various functionality using software or program modules. Generally, software includes routines, programs, applications, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communication media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer. Computer storage media refer to media for storage of information in contrast to mere signal transmission, carrier waves, or signals per se. Thus, computer storage media refers to non-signal bearing media, and is not communication media.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A display system comprising:
a cover panel;
a display panel including both multiple display pixels and multiple sensor elements configured to detect infrared light reflected from an object within a threshold distance of a display surface of the cover panel; and
a filter layer positioned between the display panel and the cover panel, the filter layer being configured to increase, prior to detection of the infrared light by the multiple sensor elements, rejection of near infrared light from ambient lighting or reflected from the object.

2. A display system as recited in claim 1, the filter layer being further configured to reduce rejection of both viewable light and infrared light.

3. A display system as recited in claim 1, the filter layer comprising a patterned filter patterned to have portions of the filter layer above the multiple sensor elements reject near infrared light, and other portions of the filter layer not above the multiple sensor elements not reject near infrared light.

4. A display system as recited in claim 1, the filter layer comprising a blanket filter with all portions of the filter layer having approximately the same light absorption and reflection characteristics.

5. A display system as recited in claim 1, the filter layer comprising a film having one or more light absorbing dyes screen-printed on a bottom side of the cover panel.

6. A display system as recited in claim 1, the filter layer comprising a polymer substrate on which one or more light absorbing dyes are screen-printed, the polymer substrate being affixed to a bottom side of the cover panel, and the cover panel being affixed to the display panel.

7. A display system as recited in claim 1, the filter layer comprising a polymer or inorganic coating compounded with one or more light absorbing dyes to form sheet media, the sheet media being affixed to a bottom side of the cover panel, and the cover panel being affixed to the display panel.

8. A display system as recited in claim 1, the filter layer comprising an adhesive mixed with one or more light absorbing dyes, the adhesive affixing the cover panel to the display panel.

9. A display system as recited in claim 1, the near infrared light comprising light having wavelengths between 680 nm and 810 nm.

10. A display system as recited in claim 2, the viewable light comprising light having wavelengths between 400 nm and 680 nm.

11. A display system as recited in claim 1, the filter layer rejecting near infrared light in a range of wavelengths to which the multiple sensor elements respond.

12. A method implemented in a display system, the method comprising:
transmitting, from one or more infrared light sources, infrared light through a filter layer and a cover panel of the display system; and
receiving, at one or more sensor elements in display pixels of a display panel of the display system, infrared light reflected from an object within a threshold distance of a display surface of the cover panel, the filter layer being configured to increase rejection of both near infrared light reflected from the object and near infrared ambient light prior to receiving the infrared light by the one or more sensor elements, and the filter layer being patterned to increase rejection of near infrared light above the one or more sensor elements in a layer of the display panel but not above other areas of the layer of the display panel.

13. A method as recited in claim 12, the filter layer being positioned between the display panel and the cover panel, and the filter layer being further configured to reduce rejection of both viewable light and infrared light.

14. A method as recited in claim 12, the filter layer being included in the display panel.

15. A method as recited in claim 12, the filter layer rejecting near infrared light in a range of wavelengths to which the one or more sensor elements respond.

16. A method of generating a display system by a manufacturing system, the method comprising:
obtaining a cover panel;
obtaining a display panel including both multiple display pixels and multiple sensor elements configured to detect infrared light reflected from an object within a threshold distance of the cover panel;
obtaining a filter layer configured to reduce rejection of both viewable light and infrared light, and to increase rejection of near infrared light, the near infrared light having wavelengths between 680 nm and 810 nm, the filter layer comprising a blanket filter with all portions of the filter layer having approximately the same light absorption and reflection characteristics; and
affixing, by the manufacturing system, the cover panel to the display panel with the filter layer positioned between the display panel and the cover panel.

17. A method as recited in claim 16, the filter layer being configured to increase rejection of near infrared light in a range of wavelengths to which the multiple sensor elements respond.

18. A method as recited in claim 12, the filter layer being positioned between the display panel and the cover panel.

19. A method as recited in claim 12, the filter layer comprising a polymer substrate on which one or more light absorbing dyes are screen-printed, the polymer substrate being affixed to a bottom side of the cover panel, and the cover panel being affixed to the display panel.

20. A method as recited in claim 12, the filter layer comprising a polymer or inorganic coating compounded with one or more light absorbing dyes to form sheet media, the sheet media being affixed to a bottom side of the cover panel, and the cover panel being affixed to the display panel.

* * * * *